United States Patent [19]
Franke

[11] 4,351,298
[45] Sep. 28, 1982

[54] INTERNAL COMBUSTION ENGINE AND INTERMEDIATE FLANGE MEMBER FOR SUCH AN ENGINE

[76] Inventor: Walter Franke, Hittfelder Kirchweg 22, 2105 Seevetal 3, Fed. Rep. of Germany

[21] Appl. No.: 55,074

[22] Filed: Jul. 5, 1979

[30] Foreign Application Priority Data

Jul. 19, 1978 [DE] Fed. Rep. of Germany ....... 2831694

[51] Int. Cl.³ ...................... F01N 3/10; F02M 25/06
[52] U.S. Cl. .................................. 123/432; 123/429; 123/430; 123/431; 123/568; 123/308; 123/179 G; 123/1 A
[58] Field of Search ............... 123/568, 432, 431, 430, 123/429, 308, 179 G, 1 A

[56] References Cited

U.S. PATENT DOCUMENTS

| | | | |
|---|---|---|---|
| Re. 26,603 | 6/1969 | Von Seggern et al. | 123/432 |
| 1,625,007 | 4/1927 | Weeber | 123/568 |
| 2,354,179 | 7/1944 | Blanc | 123/568 |
| 2,652,040 | 9/1953 | Tritt | 123/568 |
| 3,087,480 | 4/1963 | Baudry | 123/432 |
| 3,364,911 | 1/1968 | Baudry et al. | 123/575 |
| 3,416,503 | 12/1968 | High | 123/568 |
| 3,498,274 | 3/1970 | Chapman | 123/568 |
| 3,859,971 | 1/1975 | Rauen | 123/432 |
| 3,866,585 | 2/1975 | Kopa | 123/568 |
| 4,018,198 | 4/1977 | Williams | 123/568 |
| 4,117,813 | 10/1978 | Yamashita | 123/568 |
| 4,119,071 | 10/1978 | Hattori | 123/568 |
| 4,286,561 | 9/1981 | Tsutsumi | 123/432 |

*Primary Examiner*—Wendell E. Burns
*Attorney, Agent, or Firm*—Toren, McGeady & Stanger

[57] ABSTRACT

An internal combustion engine having a cylinder block comprising one cylinder or a plurality of cylinders, a piston reciprocable in each cylinder, a crank shaft, a cylinder head with inlet and exhaust valves, inlet and exhaust conduits, an ignition or injection device and valve timing means operatively associated with the cylinder head, fuel supply means in communication with the engine intake side, a feed line for supplying a pressurized or ambient air pressure additional fluid such as a gaseous or a liquid fluid to the cylinders of the engine toward a location upstream of the inlet valve seat(s). The feed line outlet may be formed as a Venturi tube. The feed lines and portions of the intake and exhaust conduits may be incorporated into an intermediate flange member adapted to be mounted on the engine block intermediate the intake/exhaust conduits and respective associated intake/exhaust manifolds. The feed lines may include non-return valve means. The additional fluid may comprise air, starter gas or an emulsion made up of drilling oil and water.

10 Claims, 8 Drawing Figures

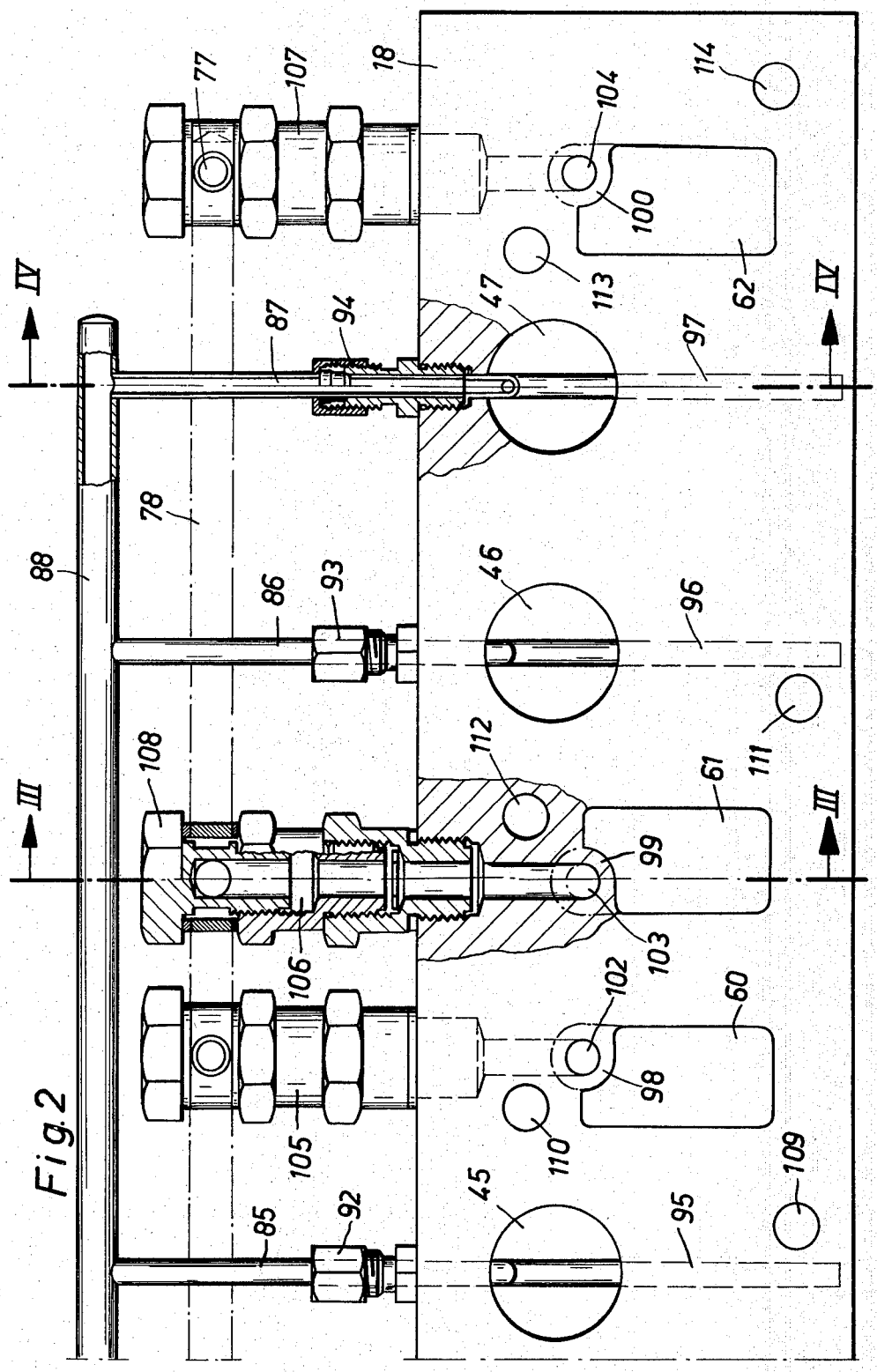

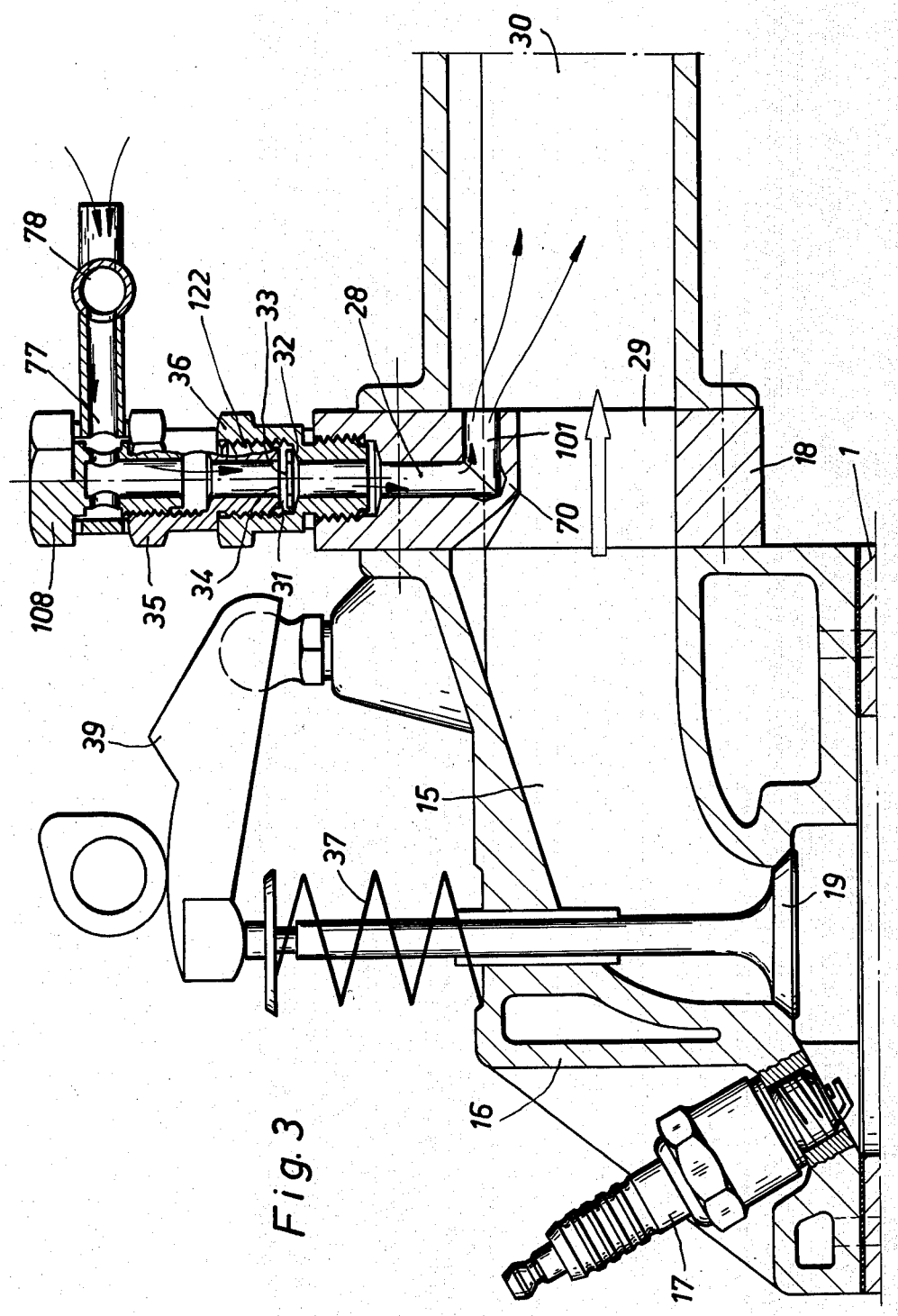

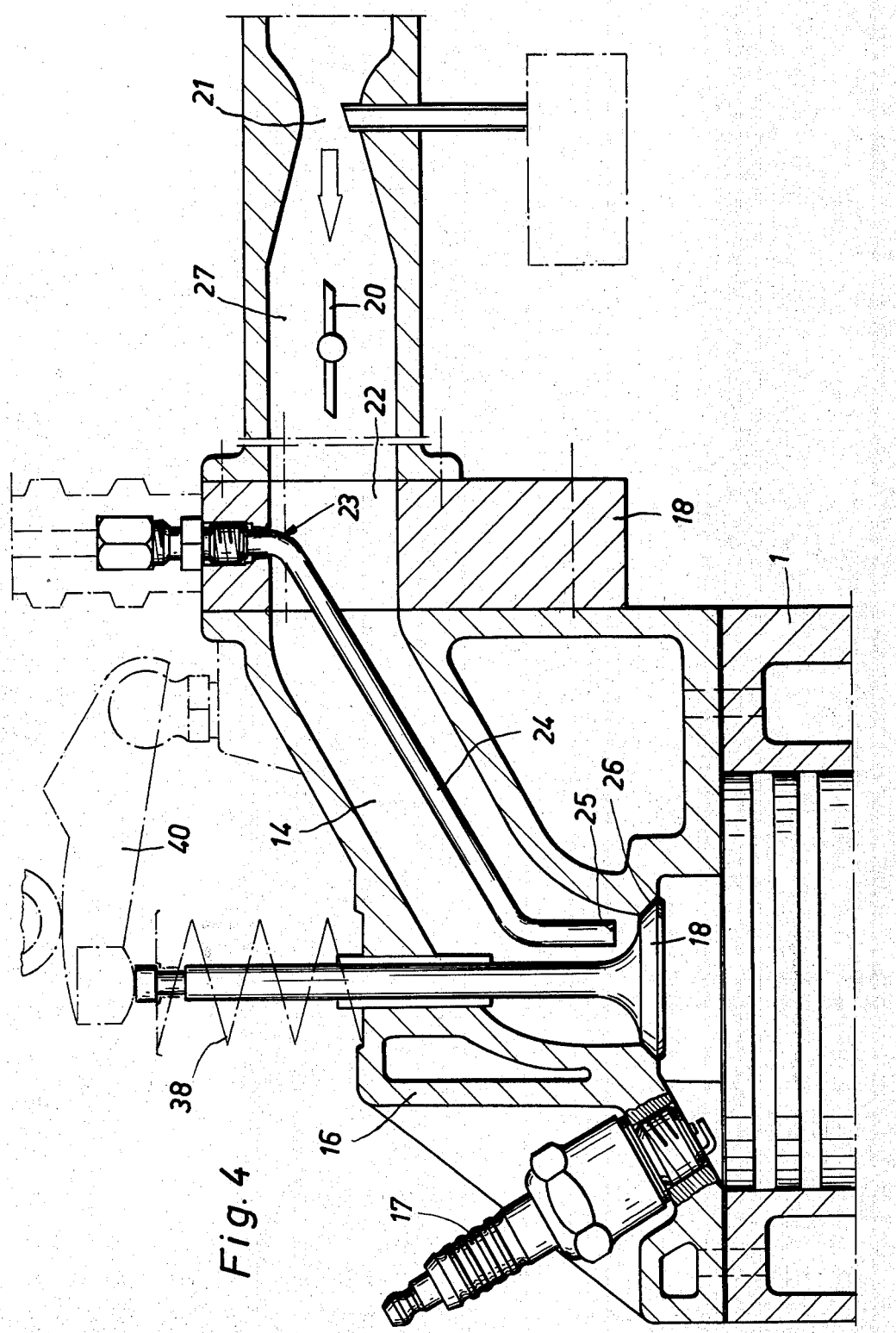

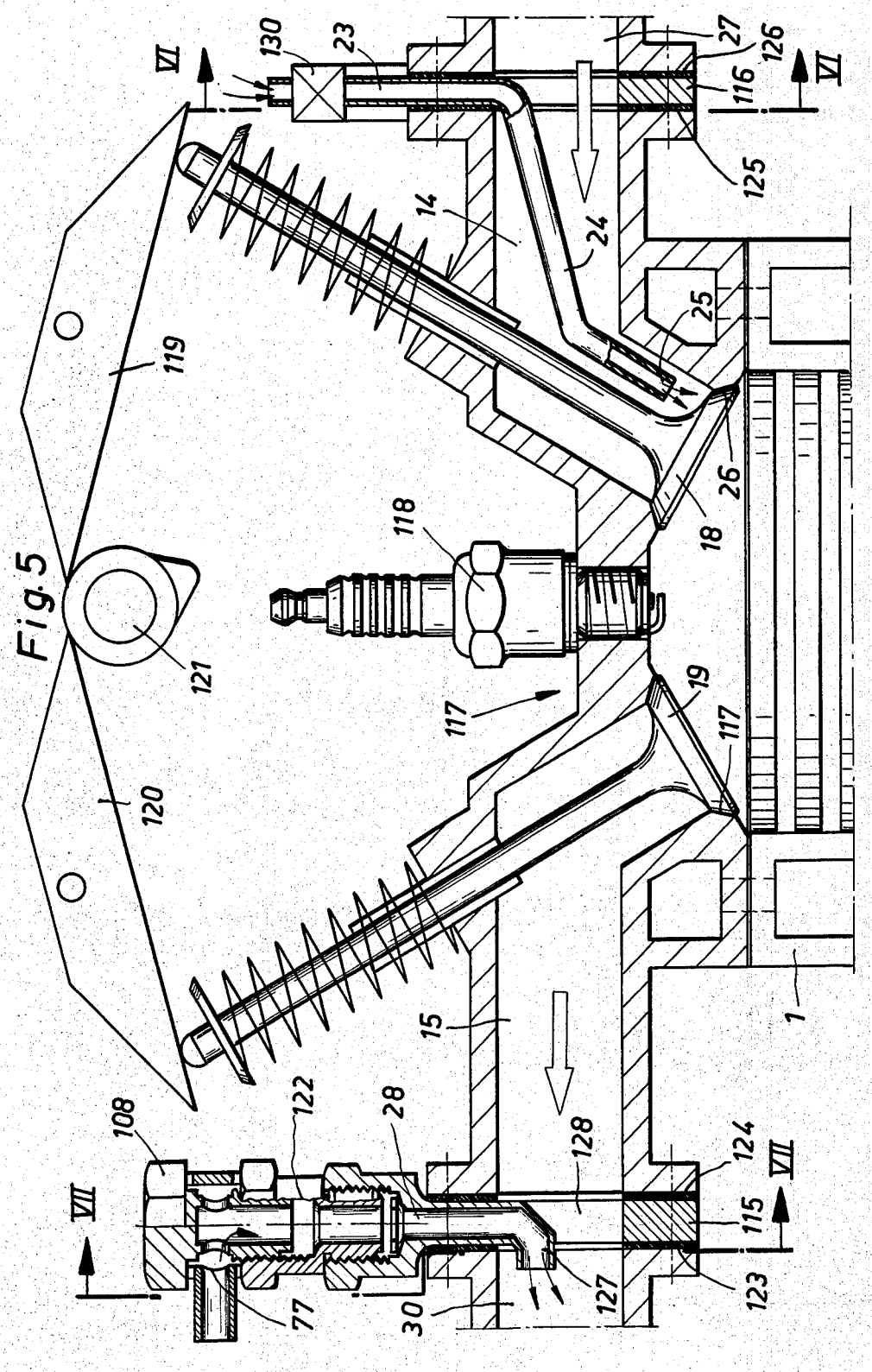

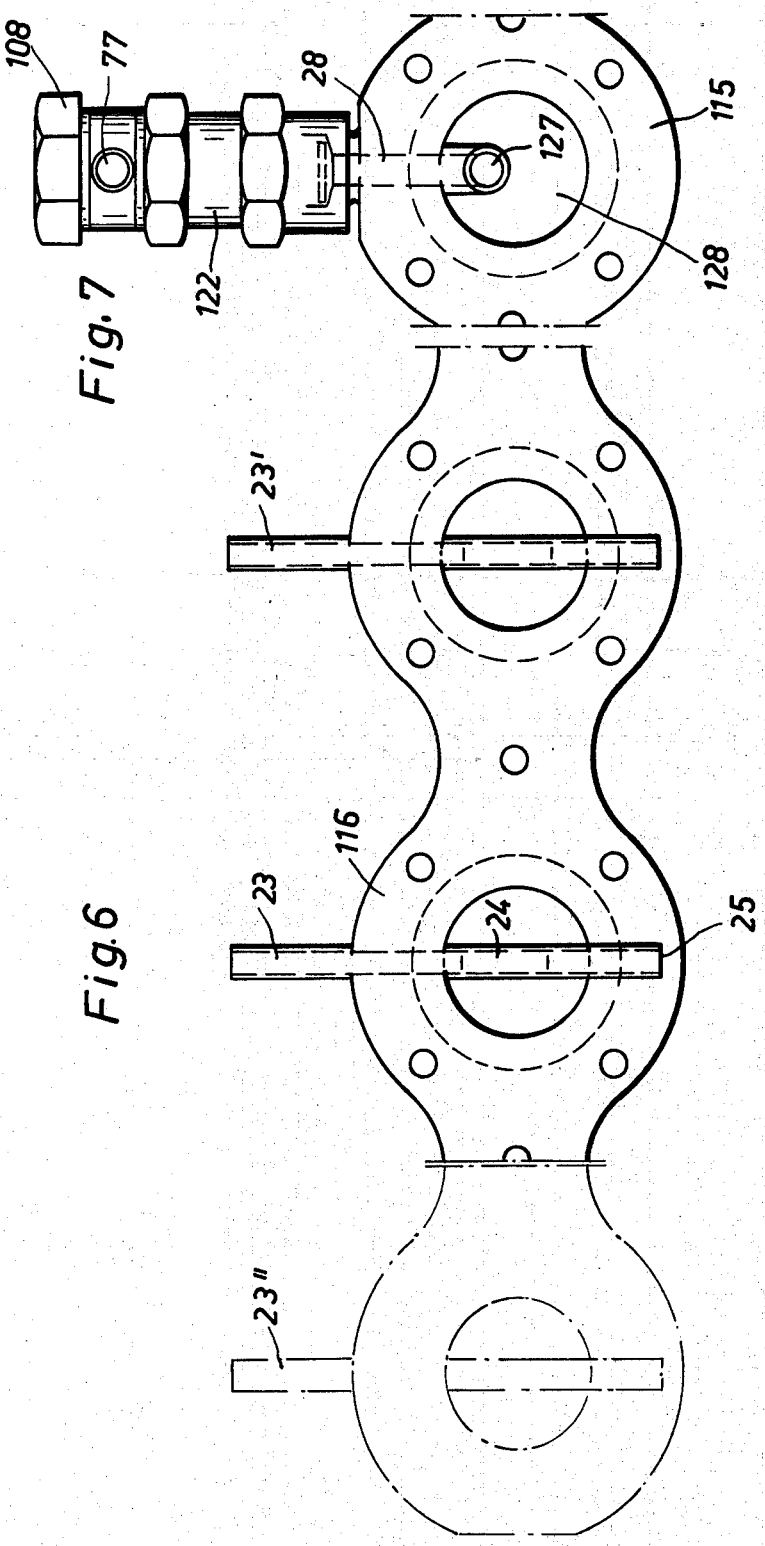

INTERNAL COMBUSTION ENGINE AND INTERMEDIATE FLANGE MEMBER FOR SUCH AN ENGINE

The present invention relates to an internal combustion engine comprising a cylinder block with at least one cylinder and a piston reciprocable within this cylinder, a cylinder head in which are mounted inlet and exhaust valves, an ignition device or an injection device communicating with the at least one cylinder wherein the inlet valve communicates with an intake conduit, the exhaust valve communicates with an exhaust conduit, and a feed line communicates with the intake conduit at a location upstream of the inlet valve.

The present invention, furthermore, relates to an intermediate flange member adapted to be mounted on an internal combustion engine as defined above.

In heretofore known internal combustion engines of this type, also including multi-cylinder engines, it is known to provide feed means for an additional fluid, these feed means being associated with each cylinder. Thus, it is known, for example, to feed water into the cylinder head or the intake conduit or optionally likewise into the intake manifold whereby the amount of water introduced is dependent upon the working pressure within the working space of the cylinder. The relevant heretofore known conventional means are rather complicated and include a valve assembly having an actuating element that is subject to the working pressure within the working space.

It has also been proposed to introduce an additional fluid at a location in an intermediate height with respect to the piston stroke whereby the fluid intake will likewise be determined by the suction effects generated by the piston when the latter moves towards its bottom dead center position. The additional fluid in this case may be air or a liquid. In an embodiment of this type, it is required that the cylinder comprises a bore and is provided with a passage having a non-return valve. This arrangement intends to establish a layer charge on top of the head of the piston. A layer charge in this position, however, affects less directly the ignition of the charge at the time of ignition and likewise does not interfere with the combustion from the ignition time onwards. The present invention relates particularly to a feed arrangement of the type stated initially in the present specification which arrangement includes a feed line communicating with the intake conduit at a location upstream of the inlet valve. An arrangement of this type is known by the German Laying-Open specification No. 2,557,137. This prior art arrangement, however, relates to an internal combustion engine operating on the basis of methanol intermixed with air. In this heretofore known arrangement is provided an auxiliary fuel circuit connected to the feed line for feeding a combined gaseous mixture rich in gasoline and hydrogen. The fluid feed is effected on the side of the inlet valve seat facing the intake conduit but in a position possibly directly adjacent the ignition device. By this additional fluid feed is intended in fact to provide a rich mixture in the vicinity of the ignition device. This constitutes a per se known expedient for facilitating ignition, especially in cases when the main intake conduit supplies a lean mixture.

When feeding additional fluids, special arrangements may be provided for enhancing the fluid feed by means of externally applied pressure. By applying an external pressure, there will be obtained a well-tuned effect because in dependence upon the operative condition of the engine there will be effected a feed overriding this operative condition. This is disadvantageous for example when supplying a rich mixture because thereby a perfect combustion will be interfered with.

It is an object of the present invention to provide a novel and improved internal combustion engine.

It is another object of the present invention to provide an improved internal combustion engine of the type as stated in the first paragraph of the present specification wherein by means of a feed line may be introduced into the engine a fluid which even with an initially insufficient combustion allows substantially pollutant-free exhaust gases but especially improves the combustion so that there will be delivered exhaust gases that are substantially free from non-combusted components, whereby the location of feed-in not only achieves an improved combustion but also an improved utilization of the normal petrol-air mixture supplied to the engine.

It is still another object of the present invention to provide an intermediate flange member adapted to be mounted on the engine block of an internal combustion engine in a position intermediate the intake conduit and the associated intake manifold.

In accordance with the present invention, these objects are achieved by the expedients that a feed line is arranged in the immediate vicinity and upstream of the inlet valve or respectively adjacent the valve seat of the inlet valve, at a location being at a miximum feasible spacing from the ignition or injection device with respect to the valve seat in the direction of fluid flow, the orifice of the feed line being aligned in a plane extending substantially parallel of the valve seat of the inlet valve, and wherein this feed line is provided for feeding a fluid in addition to the fuel for the operation of the engine. The orifice virtually faces the valve seat but in a location that is being spaced as far as possible from the ignition or injection device with respect to the diameter of the valve seat. The orifice may also extend obliquely in the indicated sense with respect to the plane of the valve seat. With this arrangement, there will be supplied additional fluid by the suction effects within the working space at the indicated location, and this in a location at which the ignition properties will not be directly affected because the input of the additional fluid is remote from the ignition or injection device. The additional fluid is a fluid different from the fuel and is selected from the group of elements comprising air, starter gas and an emulsion of drilling oil and water. The feed of this additional fluid by suction effects constitutes an especially advantageous characteristic because thereby the metering is determined automatically, and this in dependence upon the operative conditions within the engine. Having this point of view in mind, the feed line advantageously is aligned in a direction along which may be utilized the suction effects of the entering mixture or air in injection type engines to entrain this additional fluid. With special advantage the orifice of this feed line forms part of a Venturi tube extending into the intake conduit in the direction of flow and terminating at the indicated location directly upstream of the inlet valve or respectively upstream of the valve seat of the inlet valve so as not to interfere with movements of the valve member.

In an advantageous embodiment it is preferred that the feed line is open at its outer end. In this case there will be aspirated air. The aspiration caused by vacuum within the working space results at the location remote from the ignition or injection device in an air enrichment or respectively some sort of air bubble that will not mix and insofar will not modify the ignitability of the normally introduced mixture but will affect the combustion during the working stroke by entraining a certain inertia of combustion. This will result not only in an improved combustion comprising all combustible components but will likewise lead to an extension of pressure formation during combustion at least over part of the duration of the power stroke so that with moderate demands on the engine there may be achieved an improved utilization of power with equalization of the loads encountered within the engine. The improvement will particularly extend so far that there may be employed standard grade petrol instead of premium blend petrol for example, even though the engine may be designed for operation on premium grade petrol.

When taking in air at the indicated location, the ignition timing is suitably advanced in comparison to normal operation, i.e. without additional fluid feed. The ignition timing advance may correspond to about 5° to 10° of the rotation of the crank shaft.

Internal combustion engines are known to include intake conduits or respectively exhaust conduits in the engine block, these conduits leading to respective valve seats, and intake or respectively exhaust manifolds being bolted externally to the engine block. In this context, the term "engine block" is intended to include the cylinder head assembly. Particularly in a multi-cylinder internal combustion engine the invention advantageously provides an intermediate flange member directly on the engine block at the intake conduits, this intermediate flange member being arranged intermediate the intake conduits and the intake manifolds, and that the intermediate flange member carries the feed lines and serves as introductory member for these feed lines. By this, it is possible to mount the feed lines by a simple mounting expedient for all cylinders even when the feed line is in the form of a Venturi tube whereby the feed line extends into the intermediate flange member and within the interior thereof in a direction laterally from the flange member into respective intake conduits so that when mounting the intermediate flange member the feed line orifice will be disposed automatically in the indicated location. A conversion is, therefore, rather simple.

An advantageous embodiment of the invention provides control means for the feed line or respectively feed lines whereby this control means is controllable in response to the mixture ratio provided by the carburettor. When introducing air, the mixture ratio adjustment will be such that a greater or lesser amount of air is adapted to be taken in in proportion to an enrichment of mixture. On the whole, the quantity of air is dependent upon the cylinder capacity. Advantageously, the control means are adjusted with respect to the cylinder volume and the other operating conditions of the engine so that there may be taken in an amount of air that corresponds to approximately 5% of the cylinder capacity or respectively to a somewhat smaller volume.

Taking in air brings about a substantial improvement under normal operating conditions. The arrangement of the feed line according to the present invention, moreover, allows to likewise connect other selectable fluids, particularly in dependence upon the actual engine operating conditions. In accordance with an advantageous embodiment the feed line may be connected to a source of a starter gas. This constitutes a start-up aid for a cold engine. In accordance with another advantageous embodiment the feed line may be connected to a source of a fluid consisting of an emulsion of drilling oil and water in a proportion of 1:200 to 1:500. The emulsion provides the advantage that there will be provided a cooling effect particularly in a hot engine, in thereby likewise increasing the antiknocking properties of the engine. In this context it is substantial to the present invention that the feed-in is effected at the indicated location because thereby the ignition is virtually unaffected although the feed-in takes place through the inlet valve. Introducing an emulsion likewise leads to a certain extension of the development of combustion. Furthermore, the introduction of an emulsion contributes especially to achieving a complete combustion, similar to the introduction of air.

With respect to other fluids an advantageous embodiment of the present invention provides that the connection of the feed line is adapted to be connected differently in dependence upon the operative condition of the engine. In a multi-cylinder engine, suitably, the feed lines leading to all cylinder heads are combined and subject to a common connection control. In this case may be provided a spool valve or control gate valve in a common feed tube from which originate the individual feed lines. The spool or gate valve allows to selectively connect with sources of different fluids or to connect the feed tube to the ambient atmosphere. A valve of this type may be actuatable in dependence upon the rotary speed of the engine.

A particular further improvement of the inventive internal combustion engine resides in the fact that a feed line bent at an angle in the discharge direction is mounted within the exhaust manifold. The feed line includes a non-return valve opening toward the exhaust conduit and suitably communicating with ambient air. In this context may likewise be included a connection to a source of another fluid, particularly the above indicated emulsion, and the switching over of the connection in dependence upon operative conditions of the engine. A common characteristic of the feed lines at the inlet and exhaust manifolds is that these feed lines include a knee bend the outlet leg portion of which extends substantially in the direction of flow.

Suitably, the non-return valve comprises a small disk-shaped plate of a thickness of about 1 mm, the plate being arranged opposite a conical wall portion which is faced by an engagement surface for the disk and wherein the disk is substantially of a square configuration with rounded corners. This non-return valve distinguishes itself by a ready response, and this valve operates reliably even with a small lifting stroke of the valve member.

In an advantageous embodiment the internal combustion engine of the present invention is characterized by either an intermediate flange member with the feed lines for the intake conduits as well as for the exhaust conduit or respectively all of these conduits being disposed on one side of the engine block, or by intermediate flange members on both sides of the engine block in dependence upon the design of the engine, each intermediate flange member including the feed lines inclusive of the associated parts, particularly the non-return valves. It may be understood that the intermediate flange members include ports corresponding to the inlet and exhaust conduits. The feed lines extend radially into these ports, and within these ports the feed lines extend particularly with respect of the intake conduit on one side in such a configuration that the orifices will be disposed at the indicated location of the inlet valve seat.

The present invention, furthermore, provides an intermediate flange member of an advantageous design for the conversion of already existing engines. This intermediate flange member is characterized by ports and is adapted to be mounted intermediate intake manifolds and intake conduits and/or ports adapted to be mounted intermediate exhaust manifolds and exhaust conduits whereby a Venturi tube-shaped bent feed line extends through the flange member into the port, the feed line advantageously projecting by a portion laterally from the flange member whereby the intermediate flange member is designed as a support for the feed lines and for associated parts particularly for the valves provided. This arrangement provides a simple means for converting existing engines.

In the following, the present invention will be explained more in detail with reference to several preferred embodiments shown in the appended drawings wherein:

FIG. 2 is an enlarged fragmentary view of FIG. 1, substantially in the left hand portion of FIG. 1;

FIG. 3 is a cross-sectional view along the line III—III of FIG. 2;

FIG. 4 is a cross-sectional view along the line IV—IV of FIG. 2;

FIG. 5 is a cross-sectional view through the cylinder head, this view corresponding to a face elevational view of FIG. 1;

FIG. 6 is a cross-sectional view along the line VI—VI of FIG. 5;

FIG. 7 is a cross-sectional view along the line VII—VII of FIG. 5; and

In all Figs. of the drawings similar parts are identified by the same reference numerals respectively.

Figure 1:
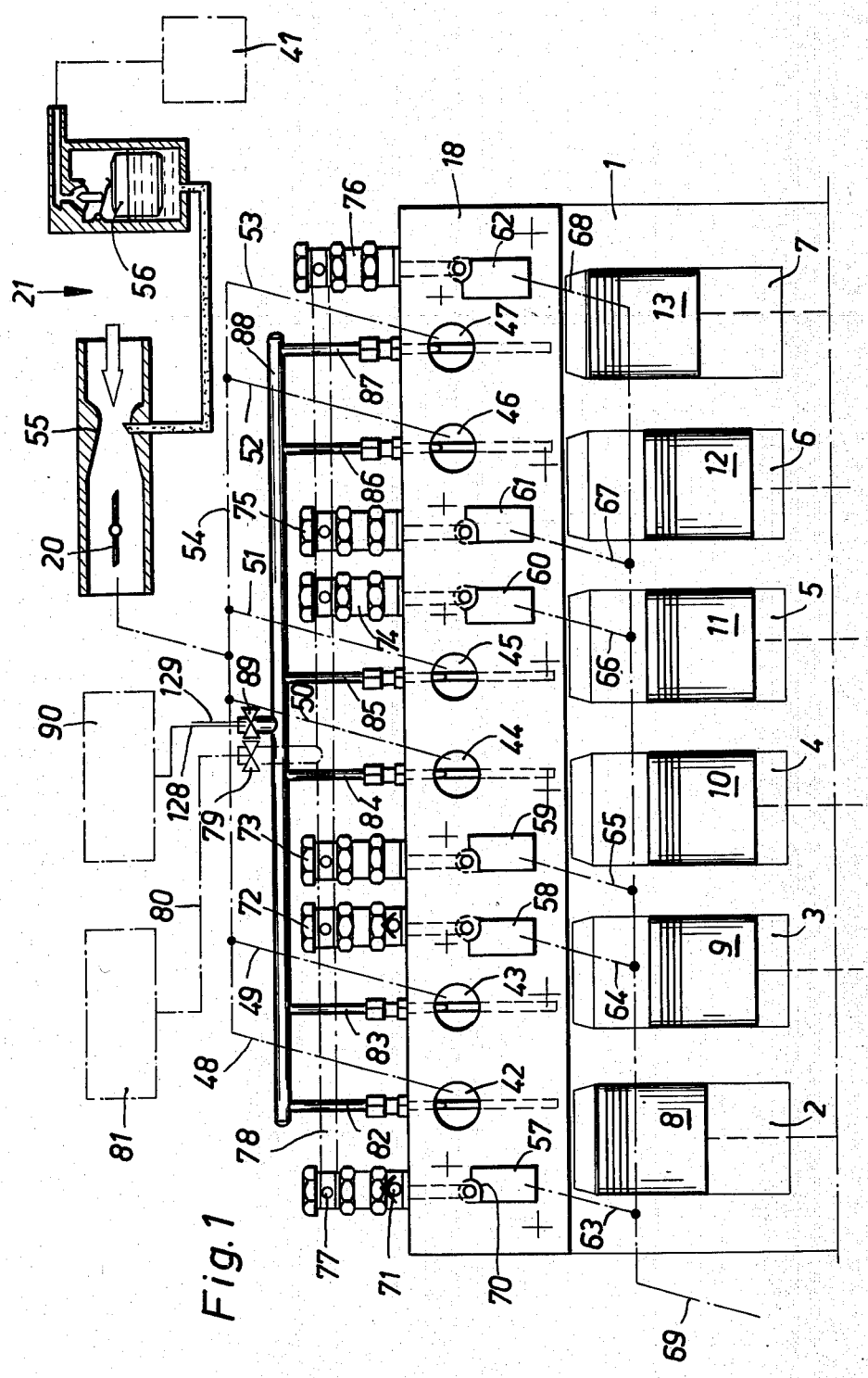
FIG. 1 is a schematical side elevational view of a multi-cylinder engine showing particularly an intermediate flange member.

FIG. 1 illustrates schematically an engine block 1 of an internal combustion engine including six cylinders 2 to 7 in which are respectively reciprocable the pistons 8 to 13 in the conventional manner not shown in detail. The pistons are also connected, in the conventional manner not shown in detail, to a crank shaft via associated connecting rods. As may be seen particularly for an engine of the type shown in FIG. 1 in FIGS. 3 and 4, the intake manifolds 14 and the exhaust manifolds 30 each face toward one side of the engine respectively. In the cylinder head 16 is arranged, on one side, a spark plug 17 for each cylinder. The inlet valves 18 and the outlet or exhaust valves 19 are arranged side by side in longitudinal direction of the in-line engine whereby the inlet and exhaust conduits are likewise arranged on the same side.

As shown in FIG. 4, an intermediate flange member 18' is bolted to the engine block 1 or respectively the cylinder head 16, and the intake manifold 27 with the throttle valve 20 and the carburettor 21 is connected to the flange member 18' on the side remote from the engine block. In the present specification, the invention is described with respect to an engine taking in a mixture. It should be pointed out that an engine of this type is not the only possible embodiment of the invention.

The intermediate flange member 18' includes a port 22 that forms the passage from the inlet manifold 14 or respectively the exhaust manifold toward the intake conduit 14 or the exhaust conduit respectively. A feed line 23 is connected to this port 22. The feed line extends into the intermediate flange member 18' from the top and is bent within the port whereby the feed line bent portion 24 is of a design so that the orifice 25 of the feed line extends in a plane substantially parallel of the valve seat 26 of the inlet valve 18 or respectively faces this valve seat in the immediate vicinity of the valve seat 26 and as close as possible thereto but in a location at a maximum spacing from the spark plug.

The intermediate flange member 18' includes a connecting fitting at its top where the feed line extends outwardly from the intermediate flange member.

The intermediate flange member 18' is shown likewise in FIG. 3. A feed line 28 extends through the intermediate flange member and into the port 29 connecting the exhaust manifold 30 to the exhaust conduit 15. The feed line 28 includes a bend whereby the feed line outlet leg portion is aligned in the direction of flow through the exhaust conduit 15 in thus providing here, likewise, a Venturi tube arrangement. On top of the intermediate flange member the feed line 28 is provided with a non-return valve 122. The valve chamber 31 includes a conical seat surface 32 facing the intermediate flange member 18' or respectively the port 29 thereof. The conical seat surface 32 may be engaged by a small disk-shaped plate 33 forming the valve member and being with a round valve chamber suitably of a square configuration with rounded corners. The disk-shaped plate is for example of a thickness of about 1 mm. A ring section-shaped engagement surface 34 is provided opposite the conical seat surface, and this engagement surface 34 may be formed for example within a slide-in socket member 35. The conical valve seat surface 32 is advantageously defined in another slide-in socket member 36 so that the vertical extension or height of the valve chamber may be adjusted. It will be apparent that the non-return valve is open when the valve member 33 engages the conical seat surface.

With respect to FIGS. 3 and 4 should be pointed out that the inlet and exhaust valves 18 respectively 19 include in the conventional manner valve stems and are being urged toward their respective seats by springs 37, 38 respectively, and are actuatable in the conventional manner by tappets 39, 40 in dependence upon the rotation of the crank shaft or respectively by a cam shaft.

The carburettor 21 is of a conventional design and communicates with a source 41 of fuel.

In FIG. 1 is shown the intermediate flange member 18' for the described type of engine. As may be seen, there are provided six ports 42 to 47 corresponding to the above described port 22. The ports 42 to 47 are respectively connected to the intake conduits 14 with respect to the one side of the engine block, and to the intake manifolds 48 to 53 on the other hand. The intake manifolds 48 to 53 in turn are connected to an intake tube 54 communicating with the carburettor 21. In FIG. 1 may be seen schematically the throttle valve 20, the funnel-shaped throat portion 55 of the carburettor as well as the conventional carburettor float 56, all of these parts being arranged downstream of the source of fuel 41, the fuel reservoir.

FIG. 1 illustrates, furthermore, six ports 57 to 62 corresponding to the described port 29. These ports 57 to 62 may for example be of a substantially rectangular configuration in dependence upon the engine design. These ports communicate on one side of the engine block with the exhaust conduits 15 of FIG. 3, and communicate on the opposite side of the engine with the exhaust pipe 69 through the exhaust manifolds 63 to 68.

In an upper corner, the ports 57 to 62 include a projection 70 extending into the port. This projection 70 is shown likewise in FIG. 3 and is adapted to receive the knee 101 of the feed line 28 the outlet leg of which extends in the outlet flow direction. This allows with simple means to bend the feed line 28 whereby the Venturi tube-shaped arrangement is provided by the arrangement of the intermediate flange member.

As may be seen, the intermediate flange member includes the non-return valves 71 to 76 corresponding to the non-return valve 122, these valves being arranged in the area of the ports 57 to 62 respectively. The inlet ports 77 of the non-return valves are connected to a feed pipe 78. This feed pipe is connected, via a controllable valve 79, either to ambient air for taking in air, or via a special connection 80, to a source 81 of a fluid such as the above mentioned emulsion.

The feed lines 82 to 87 corresponding to the feed line 23 do not require non-return valves; these feed lines open into a common feed pipe 88 which may be connected, by control means 89 such as a valve or a rotary slide valve, either to ambient air or to at least one other source 90 which may either comprise starter gas or the above mentioned emulsion. There may likewise be connected two sources for both fluids whereby in this case the control means 89 would be designed correspondingly. The control means 89 may be controllable particularly in dependence upon the rotary speed of the crank shaft, as known per se. The same applies similarly to the valve 79 although this valve may particularly also be manually operated. Because of the switching over feature, the control means 89 include an inlet 128 communicating with the source 90 and a second inlet 129 open to ambient atmosphere so as to allow selection of one of these two inlets by corresponding switch actuation.

In FIG. 2, the intermediate flange member 18' is shown partly in an enlarged scale. From this illustration may be seen the ports 45 to 47 arranged at the inlet conduits and the ports 60 to 62 arranged at the associated exhaust conduits. The feed lines 85 to 87 open into the feed pipe 88 whereby merely a connecting fitting 92 to 94 respectively is provided on the upper face of the intermediate flange member 18'.

The feed lines extend from the ports 45 to 47 in a manner similar to the bent portion 24 of FIG. 4 whereby the respective portions are identified by the reference numerals 95 to 97 in FIG. 2. In a similar manner, the ports 60 to 62 include narrow portions by the inwardly projecting projections 98 to 100 in an upper corner for providing the knees 102 to 104 corresponding to the knee 101 of FIG. 3, without requiring additional feed line means. The intermediate flange member 18' mounts at its top the non-return valve 105 to 107 corresponding to the non-return valve 122 of FIG. 3, the valves being connected to an exhaust pipe 78. As may be seen from FIG. 3 and from the illustration of the non-return valve 106, the assembly may be effected by thread assembly of fittings whereby particularly the uppermost fitting 108 is provided as a connecting fitting. As will be apparent from FIG. 2, the intermediate flange member 18' is an independent component having the connections for feed lines as well as feed line portions projecting into the inlet conduits and the members cooperating with the exhaust conduits in combination with non-return valves. For completeness' sake it should be pointed out with respect to FIG. 2 that there are provided mounting apertures 109 to 114 allowing an exact bolt mounting attachment. As will be apparent, there will be provided intermediate flange members adapted to different types and makes of engines, in thus allowing a ready conversion in the sense of the present invention.

Whereas the FIGS. of the drawings described so far illustrate an embodiment in which the inlet and exhaust conduits are arranged on the same side of the engine block, FIGS. 5 to 7 illustrate an embodiment in which are provided intermediate flange members 115, 116 on both sides of the engine block 1 or respectively of a cylinder head 117. In this embodiment the spark plug is disposed centrally on top of the cylinder space, and the inlet valve 18 and the exhaust valve 19 are arranged in a transverse plane. The inlet valve 18 engages a valve seat 26, and the exhaust valve 19 engages a valve seat 117. The valve operation is as described with respect to the embodiment of FIGS. 3 and 4. The tappets are identified by 119 and 120 and are actuated by the cam shaft 121.

It may be seen that the intermediate flange member 116 is arranged in the described manner intermediate the inlet conduit 14 and the inlet manifold 27 and introduces the feed line 23 with the bent portion 24 the orifice 25 of which is disposed upstream of the valve seat 26 in a location at a maximum spacing from the spark plug 118. At 27 may be provided a connecting fitting 130. The intermediate flange member 115 intermediate the exhaust manifold 30 and the exhaust conduit 15 includes the bent feed line 28 and the non-return valve 122. The valve 122 is connected to the feed pipe 78 or respectively to the ambient air through the fitting 108.

A detailed description of the aforedescribed parts is not believed necessary; it is merely pointed out what applies to all intermediate flange members that these flange members are suitably clamped with the interposition of gaskets 123 to 126. As will be apparent from FIG. 5, with the intermediate flange member 115 there may likewise be provided a bent feed line portion 127 in the region of the port 128 that communicates with the exhaust manifold 30.

In FIG. 6 is shown the intermediate flange member 116 with the already described feed lines 23, 23', 23".

FIG. 7 illustrates a portion of the intermediate flange member 115 with the feed line 28 which enters into the non-return valve 122 mounted on the intermediate flange member. Within the port 128 may be seen the bent feed line portion 127.

The present invention thus provides an engine with one or two intermediate flange members of the type described. Concurrently, the present invention relates to intermediate flange members for internal combustion engines, the flange members having ports for inlet and exhaust conduits and constituting support members for feed lines extending into the respective flow channels in flow direction and being of a Venturi tube type configuration. Feed line portions may extend from the inner port, and this applies particularly to the inlet conduits since within these inlet conduits the feed line must extend to a predetermined location adjacent the inlet valve seat. There have been provided intermediate flange members with ports for the inlet and the exhaust and likewise intermediate flange members having merely ports either for the inlet side or for the exhaust side whereby the intermediate flange members are provided at supports for non-return valves at least on the exhaust side.

Figure 8:
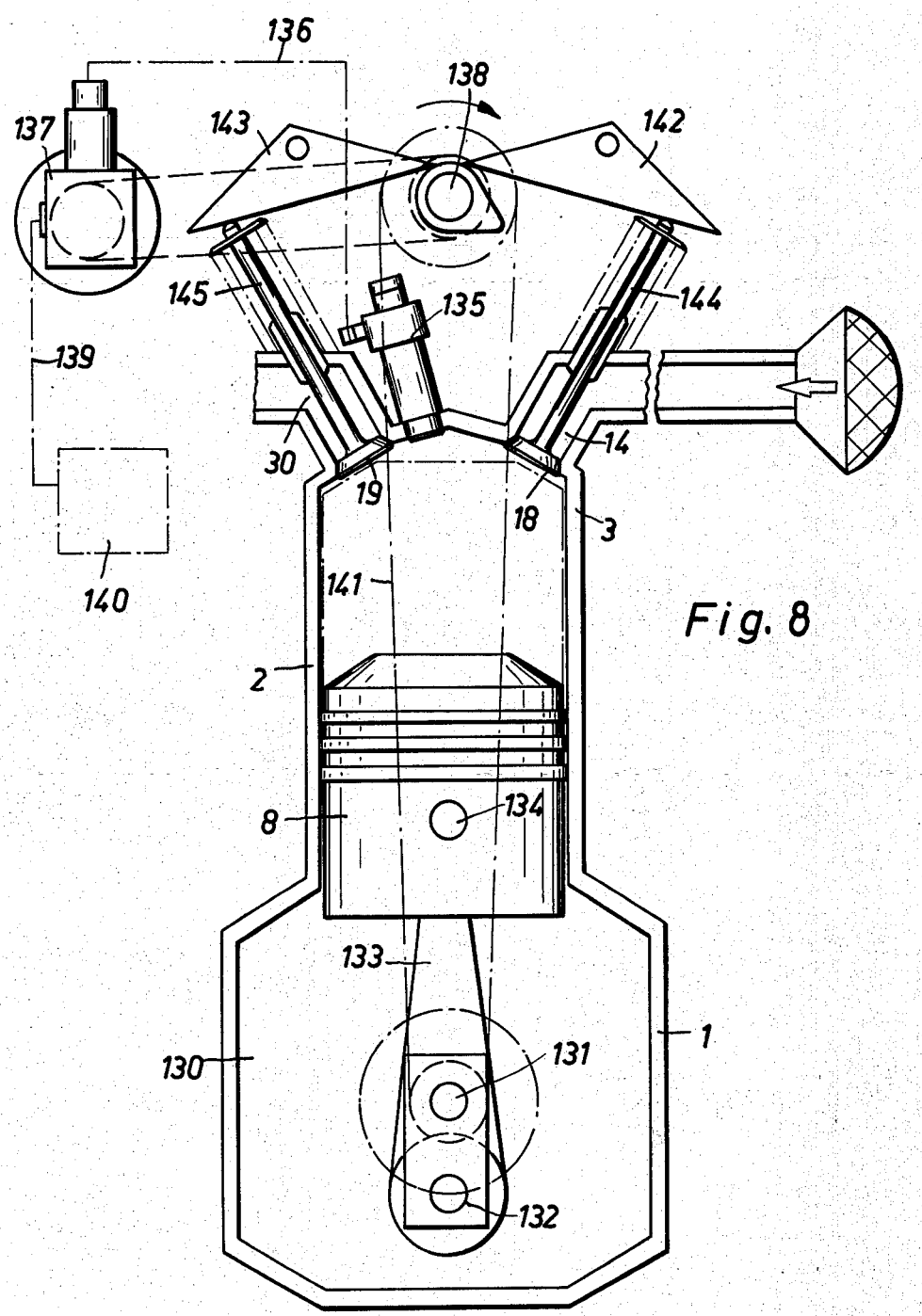
FIG. 8 is a schematical face elevational view of an internal combustion engine of the Diesel type, partly in section through the cylinder whereby the engine may include several in-line arranged cylinders.

Whereas the embodiments described so far relate to an Otto type petrol engine with a spark plug 118, a more complete engine design is shown in FIG. 8. In the embodiment of FIG. 8 is employed for example an injection device so that this engine may likewise be operated as a Diesel engine.

The engine block 1 of the engine shown in FIG. 8 includes a crank case 130 through which extends a crank shaft 131. This crank shaft includes portions that are bent at an angle defining conventional crank pins 132 on which are mounted connecting rods 133 connected to a gudgeon pin 134 in the piston 8. The piston 8 reciprocates within the cylinder 2. At the cylinder heads are arranged the intake manifold 14 and the exhaust manifold 30, and to these manifolds are respectively connected the inlet conduit and the exhaust conduit. The inlet valve is identified by 18, and the exhaust valve by 19. Intermediate these valves is arranged for example an injection device 135 which is connected through a line 136 to a source 137. The source 137 may be formed by a pump operated by a cam shaft 138. The source 137 may be connected by a line 139 to a fuel reservoir 140. The cam shaft 138 is driven by the crank shaft 131 through a toothed belt connection 141, and the cam shaft 138 actuates the tappets 142, 143 for actuating the valve stems 144, 145 respectively. The inlet and exhaust conduits are only partly shown; the configuration thereof may be seen from the preceding FIGS. In an Otto type engine design the injection device 135 would be replaced by a spark plug, and within the inlet conduit would be disposed a carburettor.

What is claimed is:

1. In an internal combustion engine at least one cylinder, a piston reciprocal within said cylinder, a cylinder head, inlet and exhaust valves located in said cylinder head, a valve seat in said cylinder head for each of said inlet and exhaust valves, one of an ignition and an injection device mounted in said cylinder head, an inlet conduit opening to and extending upstream of said inlet valve, an exhaust conduit opening from and extending downstream of said exhaust valve, a feed line communicating with and located within the inlet conduit upstream of the inlet valve, said feed line having an outlet orifice in said inlet conduit and disposed in the immediate vicinity of said valve seat of said inlet valve at a location which with respect to said valve seat is as remote as possible from the one of said ignition and injection device, control means at the opposite end of said feed line from said outlet connecting said feed line to the atmosphere, and said control means arranged to limit the amount of air drawn in through said feed line to not more than 5% of the swept volume of said cylinder.

2. Internal combustion engine, as set forth in claim 1, wherein the ignition time of said ignition device is advanced by 5% to 10% with respect to the normal operation of the engine.

3. An internal combustion engine, as set forth in claim 1, wherein the injection time of said injection device is advanced by 5% to 10% with respect to normal operation of the engine.

4. An internal combustion engine, as set forth in claims 1, 2 or 3 wherein there are a plurality of said cylinders, a different said feed line associated with each said cylinder, a common said control means connected to said feed lines.

5. An internal combustion engine, as set forth in claim 4, wherein a switch-over means connected to said feed lines, a source of starter gas connected to said feed lines by said switch-over means for selectively supplying the starter gas thereto.

6. An internal combustion engine, as set forth in claim 5, including a source of a medium comprising a 1:200 to 1:500 emulsion of drilling oil and water, said source of emulsion of drilling oil and water is connected to said feed lines.

7. An internal combustion engine, as set forth in claim 6, wherein said switch-over means connect said feed lines to said source of a starter gas and said source of an emulsion of drilling oil and water.

8. An internal combustion engine, as set forth in claim 7, wherein at least one of said control means and said switch-over means are operable in dependence upon the operative condition of the engine.

9. An internal combustion engine, as set forth in claim 1, including an engine block, said cylinders located in said engine block, an intermediate flange connected to said engine block at said inlet conduits, said intermediate flange member is located between said inlet conduits and the associated said inlet valves and serves as a support and guide for said feed lines.

10. An internal combustion engine, as set forth in claim 9, wherein said feed lines extend into said intermediate flange member and said intermediate flange member forms an extension of said feed lines extending laterally from said intermediate flange member into said inlet conduits.

* * * * *